3,326,039
APPARATUS FOR INDICATING SHEAR-BLADE
WEAR
William L. Roberts, Murrysville, Pa., assignor to United
States Steel Corporation, a corporation of Delaware
Filed Oct. 14, 1964, Ser. No. 403,757
3 Claims. (Cl. 73—104)

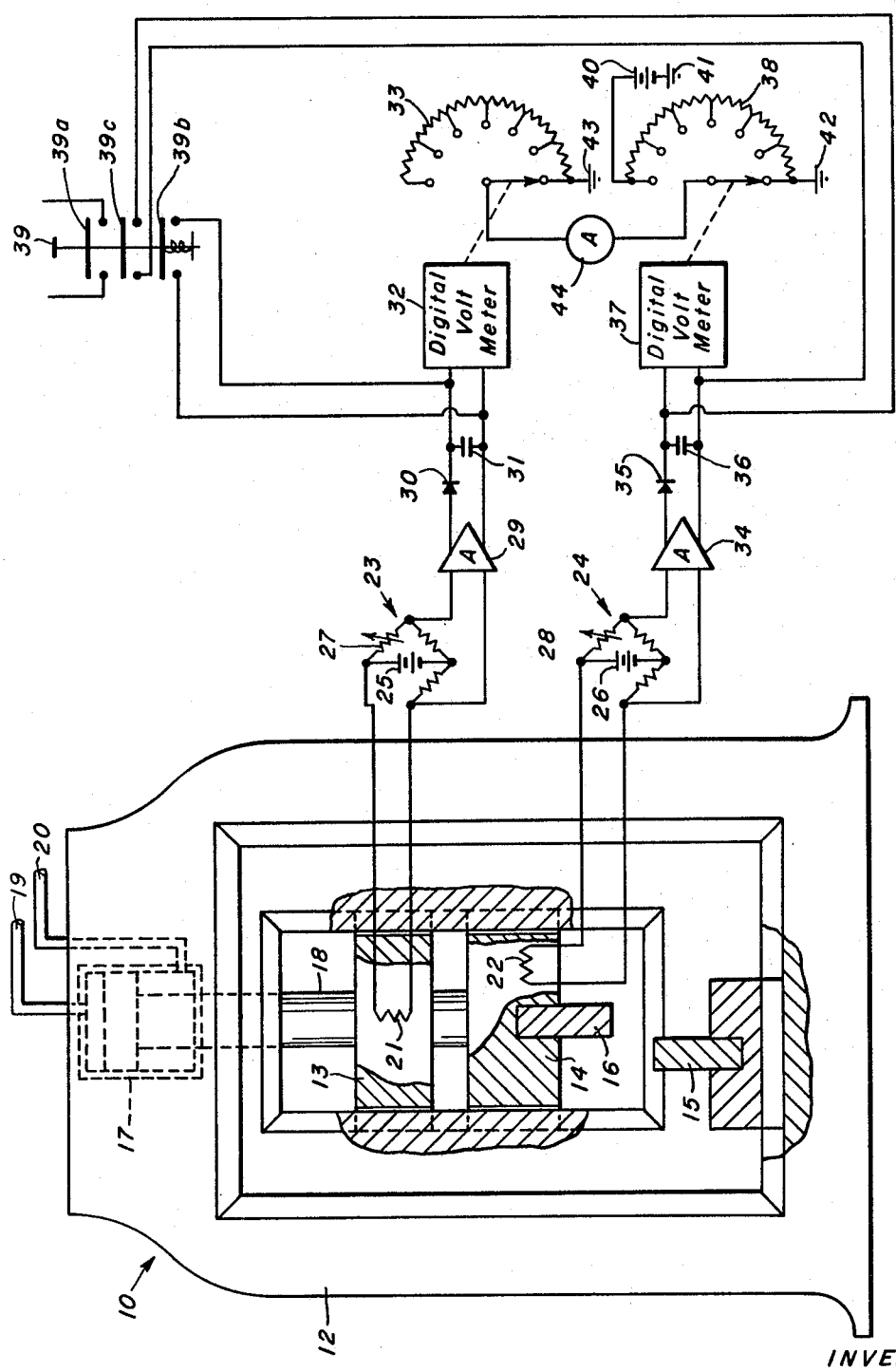

This invention relates to an apparatus for indicating the degree of wear on the blades of a shear.

The degree of wear on a tool such as a shear blade usually depends on the amount of work the tool has performed. As a tool operates, part of the energy applied thereto is consumed in deteriorating the tool. In the example of a shear blade used for cutting metal workpieces, the percentage of the energy thus consumed increases the more the blade wears. Consequently, blade wear cannot be equated directly with the total energy applied to the blade. The sharp edges of the blade gradually become more blunt and bend the sheared edges of a workpiece, rather than cutting them cleanly. An increasing blade-separating force in a direction normal to the cutting plane accompanies the shearing force. As continued use progressively dulls the blade, the ratio of blade-separating force to shearing force increases.

An object of the present invention is to provide an apparatus for measuring the ratio of the blade-separating force on a shear to the shearing force, thereby affording an indication of the wear on the blade.

A further object is to provide an apparatus of the foregoing type which embodies only simple commercially available circuit components readily installed on existing shears.

In the drawing:

The single figure is a diagrammatic side elevational view, partly in section, of a shear equipped with a wear-indicating apparatus in accordance with my invention.

The drawing shows a conventional shear 10 used for cutting metal workpieces. The shear includes a housing 12, upper and lower guide blocks 13 and 14 mounted for vertical movement in the housing, a stationary blade 15 fixed in the lower portion of the housing, and a movable blade 16 fixed to the lower guide block 14. The upper portion of the housing carries a double-acting hydraulic cylinder 17 which contains a vertically movable ram 18 attached to the two guide blocks 13 and 14. Pipes 19 and 20 conduct hydraulic fluid to and from opposite ends of the cylinder for lowering or raising the movable blade 16. The particular shear illustrated is only an example of one type to which my indicating apparatus can be applied, and does not limit the invention.

In accordance with my invention, I mount a first strain gauge 21 in a position to respond to the shearing force applied to blades 15 and 16 and a second strain gauge 22 in a position to respond to the blade-separating force. Conveniently, I can mount the strain gauges 21 and 22 on the upper and lower guide blocks 13 and 14, respectively. I orient the strain gauge 21 so that its filament strands are compressed proportionately to vertical forces. I orient the strain gauge 22 so that its filament strands are compressed proportionately to horizontal forces, that is, normal to the strain gauge 21. I connect the two strain gauges in respective bridge circuits 23 and 24 which are energized by power supplies 25 and 26. Each bridge circuit includes a respective variable resistor 27 and 28 which I adjust so that no output voltage appears across the bridge when there are no forces on the strain gauges.

I connect the input terminals of a conventional amplifier 29 across the output terminals of the bridge circuit 23, and connect a rectifier 30 and capacitor 31 to the output terminals of the amplifier. I connect the terminals of the capacitor to a conventional high input-impedence digital voltmeter 32. One example of a suitable digital voltmeter is available commercially from Non-Linear Systems, Inc., Del Mar, Calif. as the NLS Model 481, and is described in a printed publication by the supplier, catalog 356. I mechanically connect the digital voltmeter to the slider arm of a stepping-switch potentiometer 33 which has equal resistance units between its fixed contacts. Likewise I connect another amplifier 34, rectifier 35, capacitor 36, digital voltmeter 37 and potentiometer 38 in the same relation to the bridge circuit 24. The apparatus includes a multicontact push button switch 39 which has normally open contacts 39a, 39b and 39c. Contacts 39a form part of the operating circuit for shear 10, not otherwise shown. I connect contacts 39b and 39c across capacitors 31 and 36, respectively.

I connect one side of a power supply 40 to one end of the series of resistors of potentiometer 38 and ground both the other side of the power supply and the other end of the series of resistors, as indicated at 41 and 42. I also ground one end of the series of resistors of potentiometer 33, as indicated at 43. I connect an ammeter 44 between the slider arms of the two potentiometers.

In operation, I momentarily depress switch 39 to initiate operation of the shear 10 and also to remove previous charges from the two capacitors 31 and 36 vie contacts 39b and 39c. These contacts open before the shear blades 15 and 16 exert any force on the work, whereby the capacitors are conditioned to receive new charges. As the blades 15 and 16 engage the work, the electrical resistance of the strain gauges 21 and 22 decreases proportionately to the shearing and blade-separating forces respectively, and the bridge circuits 23 and 24 are unbalanced accordingly. The bridge circuits simultaneously produce output signals of magnitude proportional to these forces. The amplifiers 29 and 34 amplify these signals and transmit them to the capacitors 31 and 36. The charges on the two capacitors thus are proportional to the respective forces. As the forces are released, the rectifiers 30 and 35 prevent flow of displacement current from the capacitors back through the amplifiers. The voltages on the capacitors are applied to the digital voltmeters 32 and 37 and remain substantially constant.

When the capacitors 31 and 36 are fully discharged, the digital voltmeters 32 and 37 register no voltage, and the slider arms of the two potentiometers 33 and 38 engage the grounded ends of the resistors. Current from the power supply 40 flows through the resistors of potentiometer 38 to ground, but no current reaches the ammeter 44. As the capacitors become charged, the digital voltmeters move the slider arms through arcs proportional to the magnitude of the respective charges.

The arm of potentiometer 38 picks off a voltage from the resistors proportional to the blade-separating force. The arm of potentiometer 33 moves to a position where the resistance between the arms and the ground 43 is proportional to the shearing force. The current through the ammeter 44 is proportional to the ratio of the voltage to the resistance according to the well known formula $$I = \frac{E}{R}$$

Thus the ammeter reading represents the ratio of the blade-separating force to the shearing force.

From the foregoing description it is seen my invention affords a simple dependable apparatus for indicating the ratio of the two forces. As the blades wear, the ratio becomes progressively higher. Thus the apparatus foretells the need for replacing blades, and provides an indication of how much useful life the blades have at any time.

While I have shown and described only a single embodiment of my invention, it is apparent that modifications may arise. Therefore, I do not wish to be limited to the disclosure set forth but only by the scope of the appended claims.

I claim:

1. The combination, with a shear which includes a housing and a pair of relatively movable blades for cutting metal workpieces mounted in said housing, of an apparatus for indicating the degree of wear on said blades, said apparatus comprising means operatively connected with said shear for producing a first D-C voltage signal of a magnitude proportional to the shearing force exerted by said blades as they cut a workpiece, means operatively connected with said shear for simultaneously producing a second D-C voltage signal of a magnitude proportional to the blade-separating force on said blades, a pair of capacitors connected respectively with the two signal-producing means to be charged proportionately to the magnitudes of the two signals, and means connected with said capacitors for indicating the ratio of the magnitudes of charges thereon, which ratio is indicative of the blade wear.

2. A combination as defined in claim 1 in which said signal-producing means includes strain gauges mounted on said shear to respond to the respective forces, bridge circuits in which said gauges are connected, and amplifiers and rectifiers connected to said circuits to produce output voltages proportional to the forces.

3. A combination as defined in claim 1 in which said ratio-indicating means includes respective digital voltmeters connected to said capacitors, potentiometers connected to said voltmeters to be adjusted in accordance with the charges on the capacitors, and an ammeter connected to said potentiometers and adapted to pass current of a magnitude proportional to the ratio.

References Cited

UNITED STATES PATENTS

| | | | |
|---|---|---|---|
| 2,054,787 | 9/1936 | Beavers et al. | 73—104 X |
| 2,498,881 | 2/1950 | Eldridge | 73—104 X |
| 3,084,539 | 4/1963 | Wentworth | 73—114 |
| 3,194,064 | 7/1965 | Miles | 73—101 |

RICHARD C. QUEISSER, *Primary Examiner.*

G. I. McCLELLAND, *Assistant Examiner.*